(12) United States Patent
Green, Jr. et al.

(10) Patent No.: US 7,277,790 B1
(45) Date of Patent: Oct. 2, 2007

(54) COMBUSTION DIAGNOSTIC FOR ACTIVE ENGINE FEEDBACK CONTROL

(75) Inventors: Johney Boyd Green, Jr., Knoxville, TN (US); Charles Stuart Daw, Knoxville, TN (US); Robert Milton Wagner, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 11/380,019

(22) Filed: Apr. 25, 2006

(51) Int. Cl.
*G06G 7/70* (2006.01)
*F01L 1/34* (2006.01)

(52) U.S. Cl. .................. 701/105; 73/30.02; 73/116
(58) Field of Classification Search ............... 701/105, 701/102, 103, 104, 111; 123/436, 435, 478, 123/480; 60/772, 803; 73/116, 117.1, 117.2, 73/35.02, 35.03, 35.12
See application file for complete search history.

(56) References Cited

U.S. PATENT DOCUMENTS

| | | | |
|---|---|---|---|
| 6,273,056 B1 | 8/2001 | Shirakawa et al. | |
| 6,502,549 B1* | 1/2003 | Hoshino et al. | 123/406.41 |
| 6,520,142 B2 | 2/2003 | Nogi et al. | |
| 6,598,584 B2 | 7/2003 | Beck et al. | |
| 6,675,748 B2 | 1/2004 | Ancimer et al. | |
| 6,725,829 B2 | 4/2004 | Kataoka et al. | |
| 6,732,723 B2 | 5/2004 | van Nieuwstadt | |
| 6,754,577 B2* | 6/2004 | Gross et al. | 701/103 |
| 6,880,524 B2 | 4/2005 | Gates et al. | |
| 7,117,078 B1* | 10/2006 | Gangopadhyay | 701/103 |

| | | | |
|---|---|---|---|
| 2004/0149272 A1 | 8/2004 | Kurtz et al. | |
| 2006/0254279 A1* | 11/2006 | Taware et al. | 60/772 |

FOREIGN PATENT DOCUMENTS

| | | |
|---|---|---|
| EP | 1122417 | 8/2001 |
| EP | 1128049 | 8/2001 |
| EP | 1128051 | 8/2001 |

OTHER PUBLICATIONS

Green, Jr., Johney and Wagner, Robert, "Extending the Exhaust Gas Recirculation Limits in CIDI Engines," Combustion and Emission Control for Advanced CIDI Engines, FY 2001 Progress Report, pp. 99-104.

* cited by examiner

*Primary Examiner*—Stephen K. Cronin
*Assistant Examiner*—Johnny H. Hoang
(74) *Attorney, Agent, or Firm*—Kirk A. Wilson (57) ABSTRACT

This invention detects the crank angle location where combustion switches from premixed to diffusion, referred to as the transition index, and uses that location to define integration limits that measure the portions of heat released during the combustion process that occur during the premixed and diffusion phases. Those integrated premixed and diffusion values are used to develop a metric referred to as the combustion index. The combustion index is defined as the integrated diffusion contribution divided by the integrated premixed contribution. As the EGR rate is increased enough to enter the low temperature combustion regime, PM emissions decrease because more of the combustion process is occurring over the premixed portion of the heat release rate profile and the diffusion portion has been significantly reduced. This information is used to detect when the engine is or is not operating in a low temperature combustion mode and provides that feedback to an engine control algorithm.

8 Claims, 10 Drawing Sheets

2000 rpm, 2.0 bar BMEP

|  | EGR (%) | BSFC (g/hp.hr) | NOx (g/hp.hr) | PM (g/hp.hr) | HC (g/hp.hr) | Exh Temp (C) | Recovery Approach |
|---|---|---|---|---|---|---|---|
| Production | 14 | 257.8 | 2.20 | 0.13 | 3.19 | 201.9 | NA |
| Approach One | 47 | 253.1 | 0.24 | 0.07 | 6.28 | 224.2 | Adv Timing |
| Approach Two | 43 | 268.6 | 0.25 | 0.04 | 8.92 | 250.6 | Increased Rail Press |

COMBUSTION DIAGNOSTIC FOR ACTIVE ENGINE FEEDBACK CONTROL

STATEMENT REGARDING FEDERALLY SPONSORED RESEARCH

This invention was made with United States Government support under Contract No. DE-AC05-000R22725 between the United States Department of Energy and U.T. Battelle, LLC. The United States Government has certain rights in this invention.

NAMES OF PARTIES TO JOINT RESEARCH AGREEMENT

This invention was made under a joint research agreement between UT-Battelle, LLC and Ford Motor Company executed on Jun. 1, 2002. The field of the claimed invention is combustion diagnostics for diesel engines.

FIELD OF THE INVENTION

This invention is a combustion control method and apparatus for improving exhaust gas recirculation (EGR) utilization in compression ignition direct injection (CIDI) engines that lowers performance requirements for post-combustion emissions controls.

BACKGROUND OF THE INVENTION

Exhaust gas recirculation (EGR) has been used in recent years to reduce NOx emissions in light duty diesel engines. EGR involves diverting a fraction of the exhaust gas into the intake manifold where the recirculated exhaust gas mixes with the incoming air before being inducted into the combustion chamber. EGR reduces NOx because it dilutes the intake charge and lowers the combustion temperature. A practical problem in fully exploiting EGR is that, at very high levels, EGR suppresses flame speed sufficiently that combustion becomes incomplete and unacceptable levels of particulate matter (PM) and hydrocarbons (HC) are released in the exhaust. This transition to incomplete combustion is characteristically very abrupt due to the highly nonlinear effect of EGR on flame speed. In a transient operating environment, it is particularly difficult to reliably approach this instability limit without occasionally producing undesirable bursts of HC and PM emissions. The result is that diesel engines must be typically operated significantly below their maximum EGR potential, thus penalizing NOx performance. The effect of EGR on development of combustion instability and particulate formation was discovered and options for maximizing the practical EGR limit were identified. The dynamic details of the combustion transition with EGR and how the transition might be altered by appropriate high-speed adjustments to the engine is taught herein. Using the combustion diagnostic of this invention, one can alter the effective EGR limit (and thus NOx performance) by using advanced engine control strategies. All experiments described here were performed on a modern turbo-charged, direct-injection automotive diesel engine. This engine was selected on the basis that it is likely to reflect the EGR response of more advanced diesel engines proposed for automotive use. The results of this study are applicable to stationary CIDI engines, especially those experiencing transient load and/or speed demands.

In general, a direct-injection diesel engine injects a fuel into a combustion chamber with high pressure and high temperature at around the top dead center of the compression stroke of cylinder, so that the fuel is burned by its self-ignition. Here, the fuel injected into the combustion chamber proceeds being divided (atomized) into minute liquid drops by a collision with air having high density, and forms substantially a cone-shape fuel spray. The fuel evaporates from surfaces of the fuel drops and forms a fuel mixture by involving air surrounding mainly a front end and a periphery of the fuel spray. Then, the fuel mixture is self-ignited when it becomes a certain condition with its appropriate concentration and temperature necessary for an ignition, and begins to burn (premixed combustion). Then, it is considered that the portion beginning to burn becomes a core and diffusion combustion is performed involving surrounding fuel vapor and air.

In such a normal combustion of the diesel engine (hereinafter, referred to as diesel combustion), the initial premixed combustion may be followed by the diffusion combustion that burns most part of fuel. Here, nitrogen oxides (NOx) is produced at a portion in which an air excessive ratio $\lambda$ is nearly 1 in the fuel spray (fuel mixture) having un-homogeneous concentration due to a rapid generation of heat. Also smoke is produced at a portion in which a fuel concentration is too high due to a lack of air. Conventionally, some measures to reduce NOx or smoke are taken, such as recirculating part of an exhaust gas into an intake air (Exhaust Gas Recirculation, hereinafter, referred to as EGR) and increasing injection pressure of fuel.

Recirculating the inert exhaust gas into the intake air system by EGR may suppress production of NOx by decreasing combustion temperature but, on the other hand, promote production of smoke with a large amount of EGR decreasing oxygen in the intake air. Further, increasing injection pressure of fuel may promote minute fuel spray and improve air utilization rate by increasing penetration of the fuel spray, resulting in suppression of smoke, but, on the other hand, it may make a condition where NOx is produced easily. In other words, the conventional combustion of diesel engine provided a trade-off relationship on NOx reduction and smoke reduction, so that it was difficult to reduce both NOx and smoke coincidentally.

In contrast, new combustion modes have been recently proposed that provide a combustion state consisting of premixed combustion mainly by advancing the timing of fuel injection and thereby reducing NOx and smoke coincidentally and greatly. These are generally known as the name of diesel premixed combustion or premixed compression ignition combustion. This is, for example, a new combustion mode, in which a large amount of exhaust gas is recirculated by EGR and a fuel is injected at relatively early timing of the compression stroke of cylinder to mix with air sufficiently, so that the premixed mixture is self-ignited at the end of the compression stroke of cylinder and burns (for example, as shown in Japanese Patent Laid-Open Publication No. 2000-110669).

It is preferable that the rate of recirculated exhaust gas into intake air by EGR (EGR ratio) at such combustion state is set at a much higher level than that at the above-described diesel combustion. That is, a large amount of exhaust gas having larger thermal capacity than that of air is mixed and thereby density of fuel and oxygen in the premixed mixture is reduced, and as a result, the timing of self-ignition of the premixed mixture may be delayed until near the top dead center of compression of cylinder (TDC) by extending its delay time of ignition. Further, the inert exhaust gas disperses evenly around fuel and oxygen in the premixed mixture and absorbs the heat by combustion, and thereby the production of NOx may be suppressed greatly.

However, because increasing the rate of recirculated exhaust gas in the intake air by EGR means decreasing the amount of air in return, it may be difficult to perform the above-described combustion at an engine operating area where the engine load is relatively high. Thus, conventionally, when the engine operation is at relatively low load, an early fuel injection like the above is performed and EGR ratio is controlled higher than a first predetermined value that is relatively high, resulting in premixed compression ignition combustion. Whereas, when the engine operation is at relatively high load, fuel is injected at around the top dead center by changing fuel injection mode, resulting in diesel combustion.

In the meantime, in a case where the engine combustion mode is changeable between the premixed compression ignition combustion and the diesel combustion, problems exist such as a transient deterioration of exhaust gas condition at its changing and an occurrence of large noise. That is, when changed from the premixed compression ignition combustion to the diesel combustion, the EGR ratio is changed from a state where it is higher than the first predetermined value to another state where it is lower than the second predetermined value, by reducing the amount of recirculated exhaust gas by EGR. Here, if only fuel injection mode is changed at once to its injection at around TDC for the diesel combustion, the combustion consisting of the diffusion combustion mainly is performed along with an excessive EGR ratio because controlling the amount of exhaust gas recirculation needs a certain time. As a result, smoke is produced.

On the other hand, in changing from the diesel combustion to the premixed compression ignition combustion, if only fuel injection mode is changed to its early injection when the EGR ratio is not sufficiently high, the fuel may be self-ignited at the too-early timing because adjusting the amount of exhaust gas recirculation needs a certain time as well. As a result, considerably large noise of combustion is produced and an increase of NOx is produced rapidly as well. In addition, a large amount of smoke is produced by combustion of fuel having an insufficient mixture with intake air.

In view of the above-described problems, the present invention has been devised to diagnose the combustion condition of diesel by applying an effective algorithm to better sense and control combustion of a diesel engine in which its combustion is changeable between a first combustion state where its combustion consists of premixed combustion mainly (for example, premixed compression ignition combustion described above) and a second combustion state where its combustion consists of diffusion combustion mainly (for example, conventional diesel combustion).

BRIEF DESCRIPTION OF THE INVENTION

During high EGR combustion, heat release rate data show that in the low temperature combustion regime where there are low NOx and PM emissions, the portion of premixed combustion increases significantly and the diffusion portion decreases significantly. This invention detects the crank angle location where combustion switches from premixed to diffusion, referred to as the transition index, and uses that location to define integration limits that measure the portions of heat released during the combustion process that occur during the premixed and diffusion phases. Those integrated premixed and diffusion values are used to develop a metric referred to as the combustion index. The combustion index is defined as the integrated diffusion contribution divided by the integrated premixed contribution. As the EGR rate is increased enough to enter the low temperature combustion regime, PM emissions decrease because more of the combustion process is occurring over the premixed portion of the heat release rate profile and the diffusion portion has been significantly reduced. This information is used to detect when the engine is or is not operating in a low temperature combustion mode and provides that feedback to an engine control algorithm.

The combustion control apparatus is for a diesel engine having at least one fuel injector projecting into the combustion chamber of at least one cylinder of an engine, timing means for adjusting the injection timing of the fuel injectors, exhaust gas recirculation means for adjusting the amount of recirculated exhaust gas, means for measuring dynamic combustion parameters in the engine, means for determining a combustion index comprising the ratio between the premixed portion and the diffusion portion of heat release data, and a means for controlling the timing means and the exhaust gas recirculation means in response to a predetermined range of the combustion index.

DETAILED DESCRIPTION OF THE INVENTION

First experiments were performed on a 1.9 liter, four-cylinder Volkswagen turbo-charged direct injection engine under steady state, low load conditions. Engine speed was maintained constant at 1200 rpm using an absorbing dynamometer and fuel flow was set to obtain 30% full load at the 0% EGR condition. A system was devised to vary EGR by manually deflecting the EGR diverter valve. The precise EGR level was monitored (on a volume basis) by comparing NOx concentrations in the exhaust and intake. NOx concentrations were used because of the high accuracy of the analyzers at low concentrations found in the intake over a wide range of EGR levels. In typical experiments to date, fuel flow rate and injection timing were maintained constant while EGR was increased. This operating strategy introduces a complication in the analysis because the engine air-to-fuel ratio is decreased with increasing EGR due to the displacement of intake air by recirculated exhaust gases. The effect of this decrease in air-to-fuel ratio on our observations is discussed below. In future experiments, fueling adjustments will also be made with EGR changes to keep the total air-fuel ratio constant. Numerous steady state and crank angle resolved measurements were made for each EGR level, including in-cylinder pressure and exhaust gas constituents and PM. Measurement details are described below.

High- and low-speed data acquisition systems (DAS) were used for recording engine measurements. At steady state conditions, the low-speed DAS was used to record various engine temperatures, pressures, and engine out emissions. A high-speed DAS developed by Real Time Engineering (RTE; Dearborn, Mich.) was used to record crank angle resolved in-cylinder pressure from three cylinders, exhaust HC concentration, and exhaust particle "density".

In-cylinder pressure data were recorded using Kistler piezoelectric pressure transducers mounted with glow plug adapters in three cylinders. Three thousand cycles of pressure data were recorded on a crank angle resolved basis for each EGR level using the RTE system. Integrated combustion parameters (e.g., work and heat release) were calculated by integrating the in-cylinder pressure data.

Steady state measurements were made of CO, $CO_2$, HC, NOx, and $O_2$ concentrations in the raw engine-out exhaust using Rosemount and California Analytical analyzers. Crank angle resolved measurements were also made of HC concentration in the exhaust using a Fast Flame Ionization Detector (Cambustion HFR400 Fast FID; Cambridge, England). The HC sampling probe was located in the exhaust manifold and the data were recorded using the RTE system.

Conventional measurement of automotive exhaust particulates requires that the exhaust be diluted. Dilution serves two purposes: it cools the exhaust and it lowers the dew point. In these experiments, the exhaust was diluted with clean, filtered air to approximately 35±5:1 by volume. Several instruments were used for characterizing particulates in the exhaust stream on a steady state (dilute) and crank angle resolved (raw) basis.

Dilution of Exhaust: A slipstream of exhaust is fed through a heat-traced 25 mm stainless steel line to a 100 mm dilution tunnel. A 250 mm blower is used to pull HEPA-filtered air through the tunnel, and samples are taken 1 m downstream of the exhaust inlet to the tunnel. This ensures uniform mixing of the filtered air and exhaust gases before being sampled by the PM instrumentation.

Particle Mass Concentration: A Tapered Element Oscillating Microbalance (TEOM model 1105; R&P Co., New York, N.Y.) was used to measure particulate mass concentration and total mass accumulation as a function of time. A sample of diluted exhaust is pulled through a 12 mm filter to the end of a tapered quartz element. The frequency of the element changes with mass accumulation. The instrument has approximately 3 sec resolution on mass concentration.

Particle Size Distribution: A Scanning Mobility Particle Sizer (SMPS; TSI, Inc., St. Paul, Minn.) was used to measure the steady state size distribution of the particulates in the exhaust stream. The SMPS is the scanning version of an Electrical Mobility Analyzer which is used extensively in aerosol work. The particles are neutralized and then sorted based on their electrical mobility diameter. The range of the SMPS was set at 11 nm–505 nm.

Rapid Particulate Mass Emissions: A Diesel Particle Scatterometer (DPS) was used to obtain rapid scattering measurements of a raw exhaust sample taken directly from the exhaust manifold. The DPS was designed and built by Lawrence Berkeley National Laboratory. Under normal operation, it measures size distribution with a 1 sec response time. For this experiment, we used it to rapidly measure gross quantity of particulates by monitoring individual signals from its photomultiplier tubes so that it functioned as a fast "smoke" or particle "density" meter. The signals were acquired at each crank angle by the RTE system.

The previously discussed instrumentation was used to investigate the effect of EGR level on time-averaged and time-resolved combustion, emissions, and particulate behavior. When interpreting the discussion and data, recall that air-to-fuel ratio decreases toward stoichiometric with increasing EGR level. Also note that measured torque decreased approximately 15% from the lowest to the highest EGR level. All gaseous emissions and particulate data were measured in the exhaust stream before the catalyst.

Combustion Characterization with Cylinder Pressure: Net heat release (HR) and indicated mean effective pressure (IMEP) values were calculated for each cycle using cylinder pressure measurements according to well-established definitions. These specific combustion parameters were selected for the initial analysis because they are widely used for engine combustion characterization. However, it is important to note that because HR and IMEP are evaluated over the entire power stroke, they represent an integrated assessment of the entire combustion event in the selected cylinder. Details of the combustion sequence such as ignition delay or the relative contributions of premixed and diffusion combustion are typically not clearly revealed by HR and IMEP. Mean HR and IMEP showed no sudden changes as EGR was increased, but instead they decreased in a manner consistent with the overall engine efficiency. Similar trends were also exhibited by the coefficients of variation (COV) for these quantities, except that the change was positive with increasing EGR. This slight increase in COV may be indicative of the onset of combustion instability. However, the small magnitude of the COV change is in sharp contrast to the behavior observed for HC, NOx, and PM, which changed dramatically. Apparently, the flame changes that produce these emissions are relatively subtle, and such subtle details are obscured by the pressure integration process. The COV in IMEP and heat release ranged from 1.0 to 1.8% for all data sets, which is well within accepted driveability limits. Thus, one would not expect a driver to "feel" the onset of combustion events that are bad enough to greatly impact emissions. In addition to insensitivity due to integration, the HR and IMEP response may have been reduced because of the constant fueling rate in these experiments. One would expect that the corresponding decrease in air-to-fuel ratio would tend to somewhat counter the effect of dilution and help to restabilize the combustion. Specific pressure features can be identified that relate to the sudden shift in emissions described below. When such relationships are identified, evaluating possible combustion mechanisms with detailed combustion models such as KIVA (A Hydrodynamics Model for Chemically Reacting Flow with Spray) which can simulate engine pressure profiles based on fluid mechanics and chemistry will be possible.

Combustion Characterization with HC and NOx Emissions: Time-averaged HC and NOx concentrations in the raw engine-out exhaust were measured versus EGR level. This data shows NOx concentration decreasing and HC increasing with increasing EGR as would be expected. A sudden increase in HC and leveling-off in NOx occurs at approximately 45% EGR, where there appears to be a significant shift in combustion chemistry. This major transition is in sharp contrast to the slight changes observed in the integrated pressure parameters, HR and IMEP. Because of the suddenness of the emissions change at 45% EGR, it is clear that dynamic engine behavior at or above this operating point will be highly nonlinear. Thus it is imperative that any control strategies being considered should be able to accommodate such behavior. It was not possible to obtain accurate HC concentration measurements on a crank angle resolved basis for EGR levels greater than 45% because the Fast FID sampling probe was fouled by particulates at the higher levels. A preliminary analysis of the Fast FID data for EGR levels less than 45% indicates no major changes in cycle-resolved HC up to that point.

Combustion Characterization with PM: Measurements identified significant changes in PM emissions with EGR level, as was expected. Similar to the gaseous emissions (e.g., HC and NOx), there was a sharp increase in PM at a critical EGR level. This critical level corresponding to a sharp increase in PM was observed in mass concentration, particle size, and particle density.

Mass Concentration: Particle mass concentration and total mass accumulation were measured on dilute exhaust using the TEOM. The dilution ratio was maintained at 35±5:1. Mass accumulation rates were calculated based on over 100 mass data points as a function of EGR level. Mass accumulation rates begin to increase significantly at 30% EGR and continue to increase rapidly until the maximum EGR level. The intersection of the particulate mass and NOx curves represents a region where the engine out particulate mass and NOx concentration are minimized for this engine condition.

Particle Size: Particle sizing was performed on dilute exhaust using the SMPS. The dilution ratio was maintained at 35±5:1. Number concentration vs. particle diameter was measured for several EGR levels. Two aspects of the data stand out. The first is the increasing number concentration with level of EGR. The second is the increasing particle size. The particle size at the peak concentration increases by a factor of approximately two between 30% and 53% EGR.

The likely mechanism for particle growth is the reintroduction of particle nuclei into the cylinder during EGR. The recirculating exhaust particles serve as sites for further condensation and accumulation leading to larger particles. A significant fraction of the measured size distribution appears larger than the 500 nm upper bound of the SMPS for the highest EGR rates. This is significant because these particles contain much of the exhaust particulate mass. While exhaust dilution tunnels often are the source of artifact in the measurement of ultrafine particles, the effects are greatest for low dilution (<15:1) and the smallest particles (<20 nm).

A frequency plot was used to illustrate the disappearance of small particles and the growth of much larger particles. The divergence between the curves for particles >100 nm and particles 60-100 nm increases significantly at 30% EGR and continues to increase. The data appear to show that the smallest particles are contributing to the growth of the largest ones. The increase in larger particles is less steep than the increase in particle mass. The particle mass, however, increases as a function of the cube of particle diameter, and thus can be expected to increase more rapidly.

Rapid Particle "Density": Fast particle "density" measurements were made in the raw exhaust using the DPS. Recall that the photo-multiplier tube (PMT) voltage is effectively a measure of "smoke" or particle "density". A preliminary analysis of the data indicates no significant cycle-to-cycle variations in mean particle "density". While the data are preliminary, this instrument in conjunction with fast emissions and in-cylinder pressure measurements is expected to be very useful for improving our understanding of PM formation.

The results of this investigation give insight into the effect of EGR level on the development of gaseous emissions as well as mechanisms responsible for increased particle density and size in the exhaust. The time-averaged gaseous emissions results were similar to those seen in other studies. Particle sizing data showed some of the most interesting results. The results indicate that it is possible to directly measure particle growth of the exhaust particulate mass during high rates of EGR. This growth is likely caused by the recirculating exhaust particulates serving as nucleation sites for further particle growth. The DPS fast particle "density" instrument demonstrated in this study will be used extensively in future studies with fast emissions and in-cylinder pressure measurements to improve our understanding of PM formation and growth. The observation of only slight changes in the conventional engine combustion parameters of HR and IMEP at high EGR indicates that these integrated quantities are not adequate for monitoring the combustion processes responsible for the increased emissions. Quantities related to specific crank-angle-resolved details of the cylinder pressure trace are used for the diagnostic herein.

Improved exhaust gas recirculation (EGR) utilization in compression ignition, direct injection (CIDI) engines can lower the performance requirements for post-combustion emissions controls. The combustion diagnostic can potentially have >50% NOx reduction with minimal PM penalty via aggressive use of EGR in CIDI engines. Development of diagnostic tools and/or feedback control strategies to allow closed-loop control of CIDI engines in low NOx and low PM regimes will improve utilization of the diagnostic.

Actual EGR utilization is typically less than optimal because of PM and HC emissions. Contributing factors are cycle-to-cycle and cylinder-to-cylinder variations in combustion, mixing, and EGR. Extensive experiments were performed under high EGR conditions with full-pass engine control. There is potential for recovery of BSFC/BMEP penalty using the combustion diagnostic.

The engine platform used for these subsequent experiments was a Mercedes 1.7 L common rail diesel engine with cooled EGR. The engine had full-pass control (modified SwRI RPECS system) of electronic throttle, EGR valve, and fueling parameters. Instrumentation for each individual cylinder included in-cylinder pressure, regulated steady-state gaseous emissions, fast HC emissions, PM size and mass (TEOM, SMPS, Diesel Particle Scatterometer).

Figure 1:
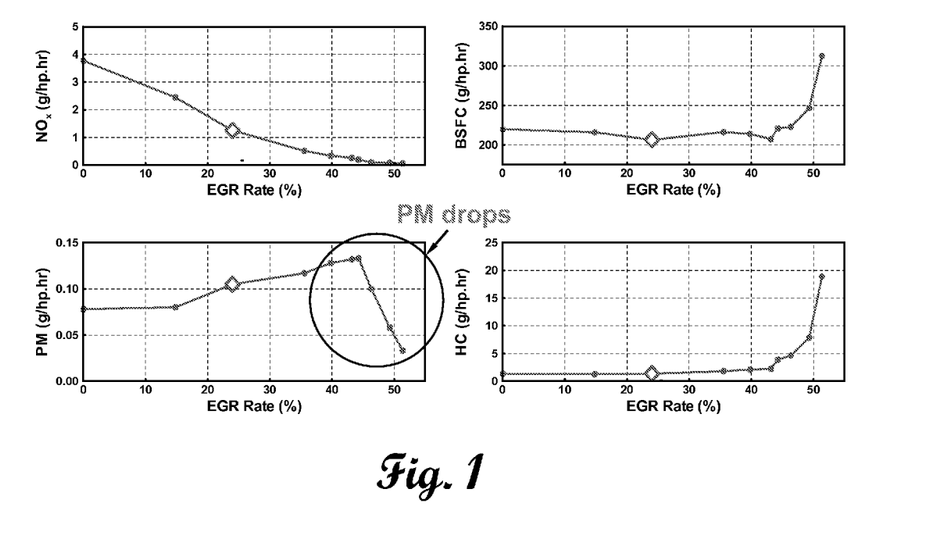
FIG. 1 is graphs showing lower engine-out NOx and PM observed at higher EGR rates with throttling; Approach 1; 1500 rpm, 2.6 bar BMEP; Production Calibration is 24% EGR.

Two approaches for reducing engine-out NOx and PM at high EGR levels were discovered. Approach 1 utilized EGR valve control, sweeping the EGR rate until the EGR valve was fully open and employing intake throttling to further increase EGR rate with EGR valve fully open. Approach 2 utilizing EGR valve control, sweeping the EGR rate until the EGR valve fully opened, and retarding injection timing with EGR valve fully open. Lower engine-out NOx and PM were observed at higher EGR rates with throttling.

As stated previously, Approach 1 utilizes a throttle to increase EGR rate beyond the maximum rate possible with only the EGR valve. EGR rate is swept with the EGR valve until the maximum rate achievable with the valve for the particular engine condition. While maintaining the EGR valve fully open, an intake throttle is utilized to further increase EGR rate. All other engine conditions including the injector parameters were held constant. Our combustion diagnostic detects shift in combustion corresponding to a drop in PM and NOx emissions observed during low temperature combustion.

Figure 3:
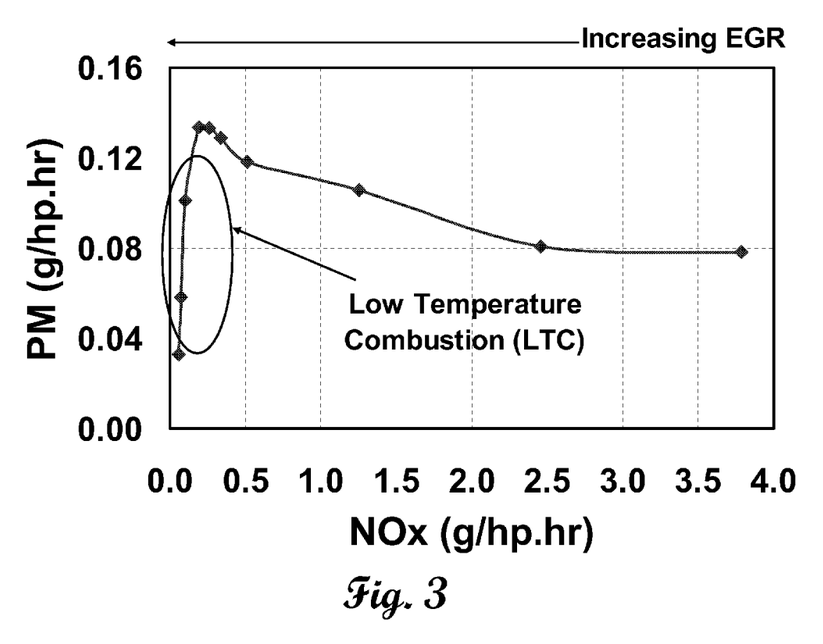
FIG. 3 is a graph showing the Not-so-"classic" PM and NOx tradeoff at 1500 rpm, 2.6 bar BMEP; Approach 1, including the low temperature combustion region.

The production calibration of the engine utilizes an EGR rate of 24% EGR. The maximum rate of EGR using only the EGR valve is approximately 44% in this engine under the specified base conditions. A steady decrease in NOx emissions was observed with increasing EGR rate. PM emissions increased with EGR rate until approximately 44%. At this point, a further increase in EGR rate resulted in a significant decrease in PM emissions. The EGR rate where the PM maximum was achieved ranged from 42% to 44% and appeared to be somewhat dependent on the humidity of the combustion air. Combustion air quality was not controlled and varied significantly between the days on which these experiments were repeated. Achieving simultaneously low NOx and low PM resulted in a penalty (or increase) in brake specific fuel consumption (BSFC). Attempts at the recovery of this penalty were successful. The low NOx and low PM combustion regime was also accompanied by an increase in unburned HC emissions. It is important to note that all of the data shown for Approach 1 were for conditions lean of stoichiometry. Intake temperatures increased from 19° C. to 61° C. and exhaust temperatures increased from 221° C. to 245° C. over the EGR range of 24% to 51%, respectively, under the 1500 rpm and 2.6 bar BMEP base condition. The increase in exhaust temperatures and HC emissions observed with increasing EGR rate may be beneficial to the conversion efficiency and regeneration of NOx adsorber catalysts.

Figure 2:
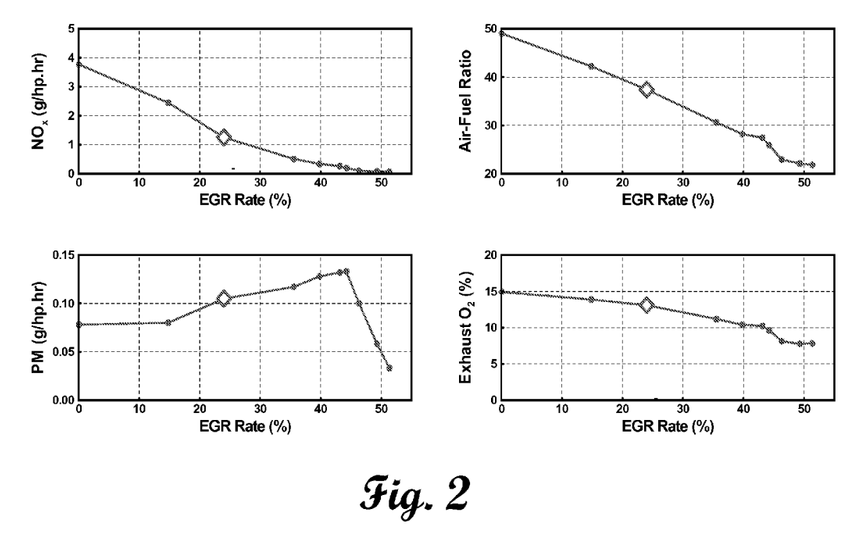
FIG. 2 is graphs showing simultaneous low NOx and low PM observed at lean air-fuel ratios; Approach 1.
Figure 4:
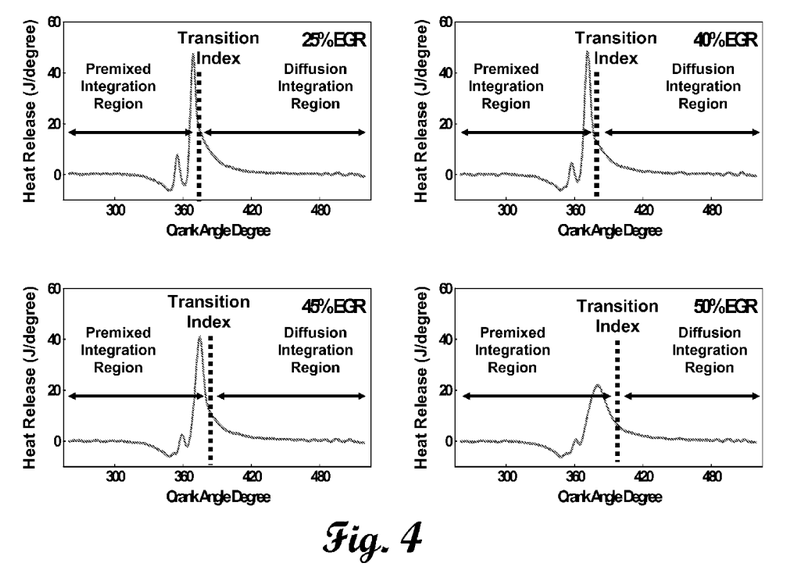
FIG. 4 is graphs showing significant shift in heat release observed at higher EGR levels; Approach 1, the transition index, the premixed region, and the diffusion region.
Figure 8:
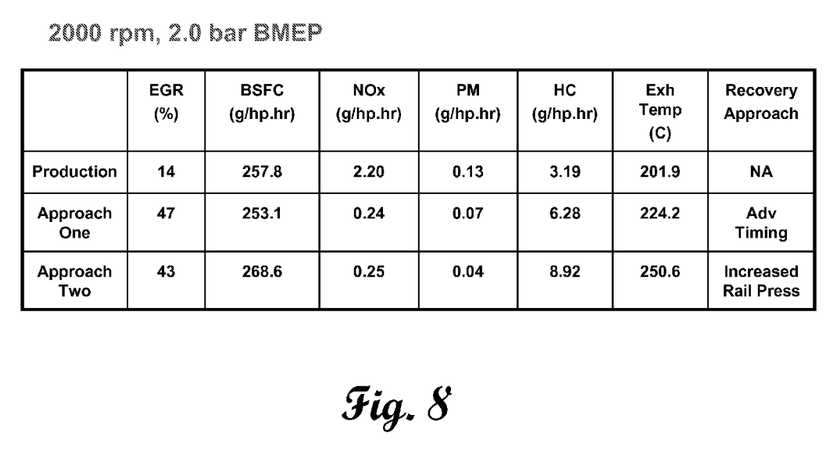
FIG. 8 is a table showing data from attempts to recover load at high EGR rates revealing significant NOx and PM reduction with some fuel penalty; COV of IMEP comparable for all cases.
Figure 9:
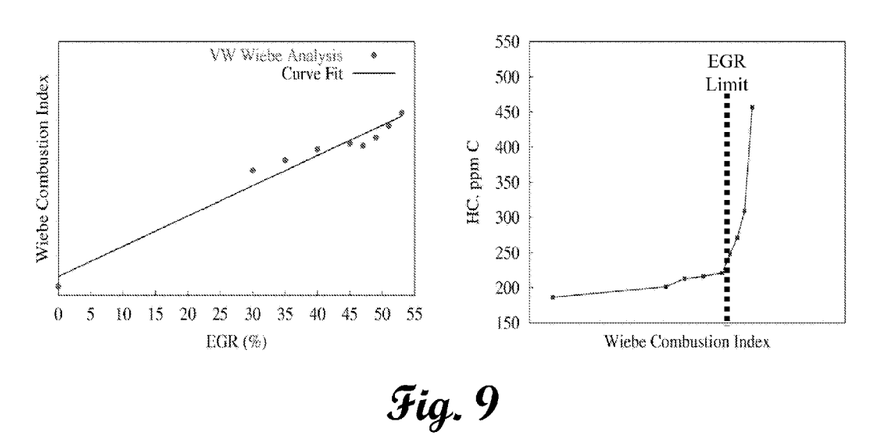
FIG. 9 is graphs from a Wiebe analysis that reveals correlation between late-stage combustion and emissions.
Figure 10:
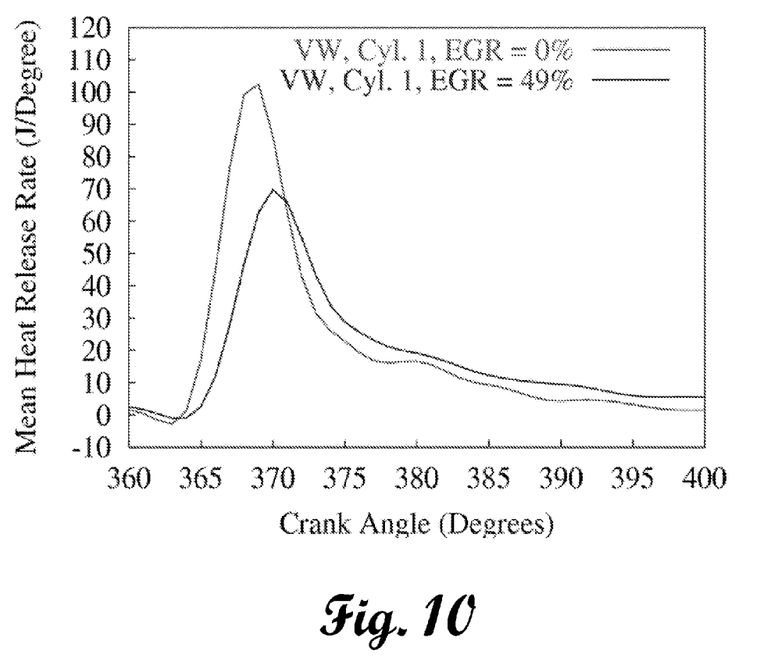
FIG. 10 is a graph showing that late-stage combustion contributes strongly to emissions at high EGR levels.

Approach 2 uses a combination of EGR and injection timing to explore the potential for achieving a simultaneous reduction in NOx and PM emissions. EGR rate is set at the maximum rate possible by maintaining the EGR valve at its fully open position. No intake throttle is used with Approach 2. With the EGR valve fully open, injection timing was retarded from the production calibration timing. All of the results discussed here correspond to 1500 rpm and 2.6 bar BMEP with EGR rate held fixed at 44%. The time duration between the pilot and main was held constant during the injection timing sweep. A preliminary investigation was performed on the effect of the relative timing of the pilot and main and will be discussed in an upcoming report. Simultaneous low NOx and low PM were observed at lean air-fuel ratios using Approach 2. There was also a significant shift in heat release observed at retarded injection timings. Trends in combustion and emissions were similar to those seen for Approach 1. Attempts to recover load at high EGR rates using this approach revealed significant NOx and PM reduction with some fuel penalty.

Figure 7:
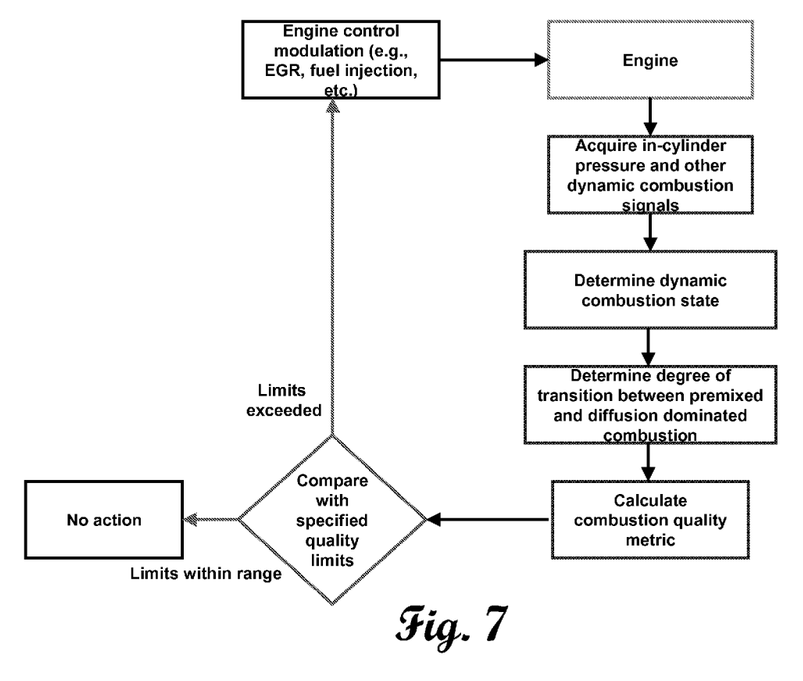
FIG. 7 is a flow diagram for the combustion diagnostic.

The combustion diagnostic of this invention performs the following logic:

```
/***************************************************************
* hrr-ratio: Detects the ratio between the premixed portion and the    *
*       diffusion portion of heat release rate profiles from a         *
*       crank-angle resolved two-column file of heat release rate      *
*       data.           *
* -------------------------------------------- *
* Version 3.1 (2002 April 22)        *
* (C) Copyright 2001 by Johney Green Jr.         *
*    modified 14 March 2001 by K. Dean Edwards         *
*       added logfile output         *
*    modified 18 April 2002 by K. Dean Edwards           *
*       redesigned the lim finding routine to pick lim at the first peak in    *
*          the second derivative after the peak in heat release        *
*    modified 19 April 2002 by K. Dean Edwards           *
*       both methods for finding lim combined         *
*    modified 22 April 2002 by K. Dean Edwards           *
*       more mods to lim finding routine and check for noise spike       *
***************************************************************/
/* ****** include files ****** */
#include <stdio.h>
#include <stdlib.h>
#include <math.h>
/* ****** Function declerations: ****** */
int help( );
int xStat(float*, unsigned long int*, float*, float*, float*, float*);
int fdif(float *x, float dx[ ], int NVal);
/* ****** Variable declerations: ****** */
#define MAX_REC 720
#define PI_VAL 3.14159265
const char PROGID[16] = "HRR-RATIO";
const char PROGVER[5] = "1.0";
const char PROGDAT[14] = "2001 May 08";
FILE *logfile;
/***************************************************************
*    Begin Main          *
***************************************************************/
int main(int argc, char *argv[ ])
/***************************************************************
* local variable control         *
***************************************************************/
/* ****** Variable declerations: ****** */
char fnin[80], fnout[80];
FILE *fin, *fout;
unsigned long int NR, *PNR = NULL, xMinInd, *PxMinInd = NULL;
float xMin, *PxMin = NULL, xMax, *PxMax = NULL;
float xAvg, *PxAvg = NULL, xVar, *PxVar = NULL;
float uSum, vSum;
float hrrmax, dyCycleMin, dymin, ddymax;
unsigned long int MAXREC=MAX_REC;
float PIVAL=PI_VAL
int x[720], xx;
float y[720], yy;
float dy[720];
float ddy[720];
float z[20000];
int i, j, k, l, del, dim, ejg, bar, lim, limchk, hrrflg, dyflg;
int imaxhrr, imindy, imaxdy, imaxddy;
int numread, fileread;
unsigned long int NR1, NR2;
/* *** Assign pointers *** */
PNR = &NR;
PxMin = &xMin;
PxMax = &xMax;
PxAvg = &xAvg;
PxVar = &xVar;
PxMinInd = &xMinInd;
/* ****** Parse command line ****** */
if (argc<3 || argc>4) help( );
sprintf(fnin,"%s",argv[1]);
sprintf(fnout,"%s",argv[2]);
if (argc==4)
lim = atoi(argv[3]); /* if 4 arguments, set hard lim */
/***************************************************************
* File control        *
***************************************************************/
if ((fin=fopen(fnin,"rt"))==NULL)
fprintf(stderr,"\a*** Cannot open file %s ***\n",fnin);
exit(1);
if ((fout=fopen(fnout,"wt"))==NULL)
fprintf(stderr,"\a*** Cannot open file %s ***\n",fnout);
exit(1);
if ((logfile = fopen("hrr-ratio.log","a")) == NULL)
fprintf(stderr,"\a*** Cannot open logfile ***\n");
exit(1);
/***************************************************************
* Error checking (bad file)        *
***************************************************************/
/* ****** initialize variables ****** */
uSum = 0;
vSum = 0;
```

-continued

```
NR1 = 0;
NR2 = 1;
limchk = 0;
xMinInd = 0;
/* ***********************************************************
****** read data for first crank angle in cycle ******
*********************************************************** */
k = 0; l = k;
numread=fscanf(fin,"%d %f\n", &xx, &yy);
x[l]=xx;y[l]=yy;
/* ****** check the burn mode integration limit ****** */
if (x[k]==lim && argc==4)   /* for hard-set li */
lim = k;
limchk = 1;
/* ****** test for numread=2 ****** */
if (numread<2 || numread>2) /* check for 2-column data */
fprintf(stderr,"\a*** Bad data file format. ***\n");
fclose(fin);
exit(1);
/* ***********************************************************
****** read data for second crank angle in cycle ******
*********************************************************** */
k = 1; l = k;
numread=fscanf(fin,"%d %f\n",&xx,&yy);
x[l]=xx;y[l]=yy;
/* ****** check the burn mode integration limit ****** */
if (x[k]==lim && argc==4)   /* for hard-set lim */
lim = k;
limchk = 1;
/* ****** test for numread=2 ****** */
if (numread<2 || numread>2) /* check for 2-column data */
fprintf(stderr,"\a*** Bad data file format. ***\n");
fclose(fin);
exit(1);
/* ****** test for increasing crank angle ****** */
if (x[k-1]>x[k])   /* check for increasing crank angle */
fprintf(stderr,"\a*** Bad data file format. ***\n");
fclose(fin);
exit(1);
/* ***********************************************************
****** read data for remaining crank angles in cycle ******
*********************************************************** */
while (x[k-1]<x[k] && !feof(fin) && k<MAXREC)
k = k + 1; l = k;
numread=fscanf(fin,"%d %f\n",&xx,&yy);
fileread=feof(fin);
x[l]=xx;y[l]=yy;
/* ****** check the burn mode integration limit ****** */
if (x[k]==lim && argc==4)   /* for hard-set lim */
lim = k;
limchk = 1;
/* ****** ttest for numread=2 ****** */
if (numread<2 || numread>2)   /* check for 2-column data */
fprintf(stderr,"\a*** Bad data file format. ***\nn");
fclose(fin);
exit(1);
/* ***********************************************************
****** All data read for cycle ******
*********************************************************** */
/* ****** check the end of file flag ****** */
if (fileread==1)
fileread = 1943;
/* ****** check the cycle length ****** */
if (k>=MAXREC)        /* too many degrees per cycle */
fprintf(stderr,"\a*** More than 720 degrees per cycle. ***\n");
fclose(fin);
exit(1);
/* ****** check the burn mode integration limit flag ****** */
if (limchk==0 && argc==4)   /* hard-set lim not found */
fprintf(stderr,"\a*** Bad burn mode integration limit. ***\n");
fclose(fin);
exit(1);
/* ***********************************************************
* Re-open file for processing                 *
*********************************************************** */
/* ****** Check for file open errors ****** */
if ((fin=fopen(fnin,"rt"))==NULL)
fprintf(stderr,"\a*** Cannot open file %s ***\n",fnin);
exit(1);
/* ***********************************************************
* Find the transition between the two burn modes        *
*********************************************************** */
dim = k;
ejg = dim;
bar = ejg;
while (!feof(fin))
/* ***********************************************************
***** read in one cycle of x,y from the file *****
*********************************************************** */
for (l=0;l<ejg;l++)
numread=fscanf(fin,"%d %f\n",&xx,&yy);
x[l]=xx;y[l]=yy;
/* ****** test for numread=2, again ****** */
if (numread<2 || numread>2)
if (numread !=-1)
del = NR1 + 1;
fprintf(stderr,"\a*** Bad data format at record %d. ***\n",del);
fclose(fin);
exit(1);
else
/* ****** File OK, processing ... ****** */
if (NR1 == 0)
fprintf(stdout,"%s: Processing %s ... \n",PROGID,fnin);
NR1 = NR1 + 1;
/* ***********************************************************
***** process cycle data to find lim *****
*********************************************************** */
hrrflg = 0;
fdif(y,dy,ejg);          /* first derivative */
fdif(dy,ddy,ejg);        /* second derivative */
NR = ejg-1;
xStat(dy,PNR,PxMin,PxMax,PxAvg,PxVar); /* find min dy for cycle */
dyCycleMin = xMin;
/****** check for noise spike in signal ******/
if (dyCycleMin<=-25)
lim = 0;
hrrflg=1;
fprintf(stderr,"ERROR: noise spike identified in
cycle %d of %s.\n",NR2,fnin);
/****** if given, use hard-set lim ******/
else if(argc==4 && hrrflg==0)
lim = lim;
hrrflg=1;
/****** else determine where diffusion burn mode begins ******/
else if (argc==3 && hrrflg==0)
dymin = 9.99e99;
ddymax = -9.99e99;
NR = ejg;
xStat(y,PNR,PxMin,PxMax,PxAvg,PxVar);        /* find peak hr */
hrrmax = xMax;
for (i=0;i<NR-2;i++)
if (y[i]==hrrmax)      /* start looking after peak hrr */
imaxhrr = i;           /* store index of peak hrr */
hrrflg = 1;            /* peak-hrr-found flag */
/*** find min dy within 30 degrees after peak hrr ***/
for (k=imaxhrr;k<=imaxhrr+30;k++)
if (dy[k]<dymin)
dymin = dy[k];
imindy = k;
/*** starting at min dy, find next peak dy ***/
dyflg = 0;
for (k=imindy;k<=NR-2;k++)
if (dy[k]>dy[k-1] && dy[k]>dy[k+1]
&& dyflg==0)
imaxdy = k;
dyflg = 1;
/*** find max ddy between peak hrr and peak dy ***/
for (k=imaxhrr;k<=imaxdy;k++)
if (ddy[k]>ddymax)
ddymax = ddy[k];
imaxddy = k;
/****** lim has been found ******/
lim = imaxddy+1;
/** endif (peak hrr) **/
/** next (scan cycle) **/
/* ***********************************************************
***** log to logfile *****
*********************************************************** */
fprintf(logfile,"%s: limit = %d\n",fnin,x[lim]);
```

-continued

```
/************************************************************
***** perform burn-mode-ratio calculation *****
************************************************************/
/*** ignore if there's a noise spike ***/
if (lim==0)
z[NR2] = 0;
else if (NR1 >= dim)
for (j=0;j<lim;j++)      /* integrated premixed portion */
uSum = uSum + ((y[j] + y[j+i]) *((j+1)-j) * PIVAL / 180);
uSum = uSum / 2;
for *j=lim;j<(bar-1);j++) /* integrated diffusion portion */
vSum = vSum + ((y[j] + y[j+1]) * **j+1)-j) * PIVAL / 180);
vSum = vSum / 2;
z[NR2] = vSum / uSum; /* (diffusion / premixed) */
NR2 += 1;
uSum = 0;
vSum = 0;
/************* goto next cycle ****************/
/************************************************************
* end of data file        *
************************************************************/
fclose(fin);
/************************************************************
* Generate output data file       *
************************************************************/
dim = 0;
del = 0;
if (NR2<(dim*del))
fprintf(stderr,"\a*** Not enough points ***\n");
exit(1);
if (fileread==1943)
NR2 = 2;
for (i=1;i<NR2;i++)
fprintf(fout,"%10.5f",z[i]);
fprintf(fout,"\n");
/************************************************************
* file control       *
************************************************************/
fclose(fout);
fclose(logfile);
exit(0);
/*************** END MAIN *****************************/
/************************************************************
* Fload : load data file       *
************************************************************/
int FLoad(FILE *fin, float *x, unsigned long int *NR)
unsigned long int MAXREC;
float xin, *Pxin = NULL;
Pxin = &xin;
MAXREC = *NR;
*NR = 0;
while ((!feof(fin))&(*NR<MAXREC))
fscanf(fin,"%f",Pxin);
x[*NR] = xin;
if (!feof(fin)) (*NR)++;
return(0);
/************************************************************
* Fload 2 : load data file with two columns.      *
************************************************************/
int FLoad2(FILE *fin, float *x, float *y, unsigned long int *NR)
unsigned long int MAXREC;
float xin, *Pxin = NULL;
float yin, *Pyin = NULL;
int numcol;
Pxin = &xin;
Pyin = &yin;
MAXREC = *NR;
*NR = 0;
while ((!feof(fin))&(*NR<MAXREC))
numcol=fscanf(fin,"%f %f",Pxin,Pyin);
/* test for numcol=2 */
if (numcol<2 || numcol>2)
fprintf(stderr,"\a*** Bad data file format ***\n");
fclose(fin);
exit(1);
else
x[*NR] = xin;
y[*NR] = yin;
if (!feof(fin)) (*NR)++;
```

-continued

```
return(0);
/************************************************************
* xStat : gets some statistics from vector x.       *
************************************************************/
int xStat(x,NR,xMin,xMax,xAvg,xVar)
float *x,*xMin,*xMax,*xAvg,*xVar;
unsigned long int *NR;
unsigned long int k;
float sum;
*xMin = x[0];
*xMax = x[0];
sum = x[0];
for (k=1;k<*NR;k++)
sum = sum + x[k];
if (x[k]>*xMax) *xMax = x[k];
if (x[k]<*xMin) *xMin = x[k];
*xAvg = sum / ((float)*NR);
for (k=0;k<*NR;k++)
sum = x[k] - *xAvg;
*xVar = *xVar + sum * sum;
*xVar = *xVar / ((float)*NR - 1);
return(0);
/************************************************************
* fdif : calculates the first difference of vector x.       *
************************************************************/
int fdif(float *x, float dx[ ], int NVal)
int k;
for (k=0;k<(NVal-1);k++)
dx[k] = (x[k+1] - x[k]);
return(0);
/************************************************************
* help : prints help screen.       *
************************************************************/
int help( )
fprintf(stderr,"HRR-RATIO: Calculates the ratio between heat release
rate burn \n    modes
during each cycle.\n\n");
fprintf(stderr,"Usage: hrr-ratio fin fout [lim]\n");
fprintf(stderr,"Options:\n");
fprintf(stderr,"fin    input file path\n");
fprintf(stderr,"fout    output file path\n");
fprintf(stderr,"lim    burn mode integration limit (optional)\n");
fprintf(stderr,"\n%s v.%s (%s)\n",PROGID,PROGVER,PROGDAT);
fprintf(stderr,"Copyright (C) 2001 by Johney
Green Jr. <greenjbjr@ornl.gov>.\n");
exit(0);
return(0);
```

Figure 5:
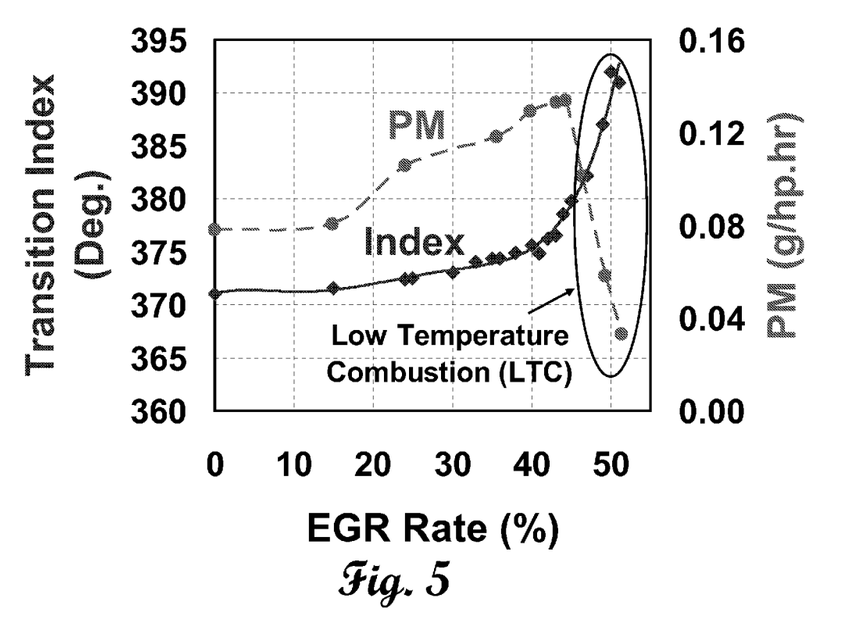
FIG. 5 is a graph showing the transition index and PM as a function of EGR rate.
Figure 6:
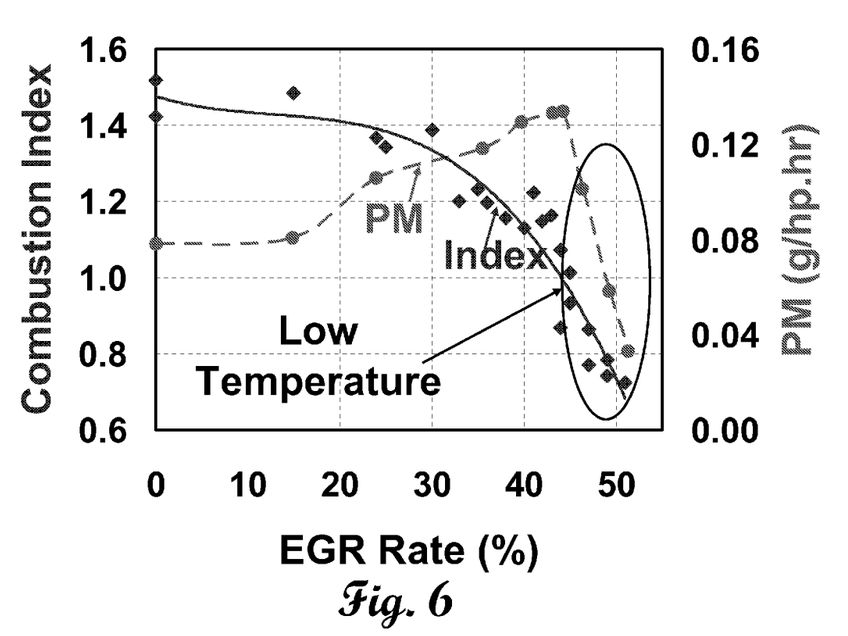
FIG. 6 is a graph showing the combustion index and PM as a function of EGR rate.

During high EGR combustion, heat release rate data show that in the low temperature combustion regime where there are low NOx and PM emissions, the portion of premixed combustion increases significantly and the diffusion portion decreases significantly. This invention detects the crank angle location where combustion switches from premixed to diffusion, referred to as the transition index, and uses that location to define integration limits that measure the portions of heat released during the combustion process that occur during the premixed and diffusion phases. Those integrated premixed and diffusion values are used to develop a metric referred to as the combustion index. The combustion index is defined as the integrated diffusion contribution divided by the integrated premixed contribution. As the EGR rate is increased enough to enter the low temperature combustion regime, PM emissions decrease because more of the combustion process is occurring over the premixed portion of the heat release rate profile and the diffusion portion has been significantly reduced. This information is used to detect when the engine is or is not operating in a low temperature combustion mode and provides that feedback to an engine control algorithm.

While there has been shown and described what are at present considered the preferred embodiments of the invention, it will be obvious to those skilled in the art that various changes and modifications can be made therein without departing from the scope.

We claim:

1. A combustion control apparatus for a diesel engine, comprising;
    at least one fuel injector projecting into a combustion chamber of at least one cylinder of an engine,
    timing means for adjusting injection timing of said at least one fuel injector,
    exhaust gas recirculation means for adjusting an amount of recirculated exhaust gas to said combustion chamber,
    means for measuring dynamic combustion parameters in said engine,
    means for determining a combustion index comprising a ratio between a premixed portion and a diffusion portion of heat release data,
    means for controlling said timing means and said exhaust gas recirculation means in response to a predetermined range of said combustion index.

2. A combustion control apparatus of claim 1 wherein said dynamic combustion parameters is at least one parameter selected from the group consisting of in-cylinder pressure, carbon dioxide, carbon monoxide, hydrocarbons, nitrogen oxides, oxygen, net heat release over an entire power stroke, and indicated mean effective pressure over said entire power stroke.

3. A combustion control apparatus of claim 1 wherein said combustion index further comprises the sequential steps of:
    a. acquiring in-cylinder pressure and dynamic combustion signals,
    b. determining dynamic combustion state,
    c. determining a degree of transition between said premixed portion and said diffusion portion,
    d. calculating said combustion index,
    e. comparing said combustion index with predetermined limits, and
    f. modulating engine parameters in response to said combustion index.

4. A combustion control apparatus of claim 3 wherein said degree of transition between said premixed portion and said diffusion portion further comprises the sequential steps of:
    a. reading crank-angle resolved data for heat release over an entire cycle,
    b. processing cycle data to find first derivative and second derivative of heat release function,
    c. finding a minimum first derivative of heat release function for said cycle,
    d. finding a peak heat release rate,
    e. finding a second minimum first derivative of heat release function within 30 degrees after said peak heat release rate,
    f. finding next peak first derivative after said second minimum first derivative,
    g. finding maximum second derivative between said peak heat release rate and said peak first derivative, and
    h. performing burn mode ratio calculation using integrated premixed portion and integrated diffusion portion.

5. A combustion control apparatus of claim 1 wherein said means for controlling further comprises at least one action selected from the group consisting of modifying injection timing, modifying fuel rail pressure, and modifying exhaust gas recirculation.

6. A method for calculating a combustion index comprising the sequential steps of:
    a. acquiring in-cylinder pressure and dynamic combustion signals,
    b. determining dynamic combustion state,
    c. determining a degree of transition between premixed and diffusion dominated combustion,
    d. calculating a combustion index,
    e. comparing said combustion index with predetermined limits, and
    f. modulating engine parameters in response to said combustion index.

7. A method of claim 6 wherein said degree of transition further comprises the sequential steps of:
    a. reading crank-angle resolved data for heat release over an entire cycle,
    b. processing cycle data to find first derivative and second derivative of heat release function,
    c. finding a minimum first derivative of heat release function for said cycle,
    d. finding a peak heat release rate,
    e. finding a second minimum first derivative of heat release function within 30 degrees after said peak heat release rate,
    f. finding next peak first derivative after said second minimum first derivative,
    g. finding maximum second derivative between said peak heat release rate and said peak first derivative, and
    h. performing burn mode ratio calculation using integrated premixed portion and integrated diffusion portion.

8. A method of claim 6 wherein said engine parameters further comprises at least one selected from the group consisting of injection timing, fuel rail pressure, and exhaust gas recirculation.

* * * * *